July 11, 1933.  H. HOLZWARTH  1,917,714
PORTABLE POWER PLANT
Filed Jan. 30, 1931  2 Sheets-Sheet 1

Inventor
Hans Holzwarth

July 11, 1933. H. HOLZWARTH 1,917,714
PORTABLE POWER PLANT
Filed Jan. 30, 1931 2 Sheets-Sheet 2

INVENTOR
HANS HOLZWARTH
BY
ATTORNEY

Patented July 11, 1933

1,917,714

UNITED STATES PATENT OFFICE

HANS HOLZWARTH, OF DUSSELDORF, GERMANY, ASSIGNOR TO HOLZWARTH GAS TURBINE CO., OF SAN FRANCISCO, CALIFORNIA, A CORPORATION OF DELAWARE

PORTABLE POWER PLANT

Application filed January 30, 1931, Serial No. 512,345, and in Germany February 5, 1930.

The present invention relates to arrangements for the drive of locomotives and including one or more explosion turbines arranged to operate the auxiliary machines, particularly the air compressor, and whose exhaust gases together with the working steam produced by the waste heat of the explosion turbine or turbines operate expansion machines directly geared to the driving wheel of the vehicle and designed to develop the necessary power output.

Such plants have already been proposed and are based upon the recognition of the fact that combustion machines, including explosion turbines, could not start under load, and were in particular not able to develop the necessary starting torque without the aid of intermediate power transmission devices or of cumbersome gear drives in combination with starting couplings.

These difficulties are overcome by the present invention whereby the expansion machines are enabled to start directly under load. There is at present a demand in railroad traffic for locomotives which can develop 3–4000 H. P. continuously. The building of machines capable of developing such capacities involves serious difficulties in piston-operated steam locomotives. The present invention provides a simple solution in the types of locomotive power plants to which the present invention relates in that one part of the expansion machine is made to drive the locomotive tender. If the part of the expansion machine operated with steam is arranged to drive the locomotive tender, while the part of such machine which is driven by exhaust gases is employed exclusively to drive the locomotive and is positioned upon such locomotive itself, there results an extremely simple arrangement. The expansion machine section of the tender may advantageously consist of piston engines, while the driving engines of the locomotive are preferably in the form of turbines.

In the accompanying drawings is shown by way of example an embodiment of the invention. In said drawings, Fig. 1 is a schematic view illustrating a longitudinal section through a locomotive and tender having my invention embodied therein;

Figure 1:
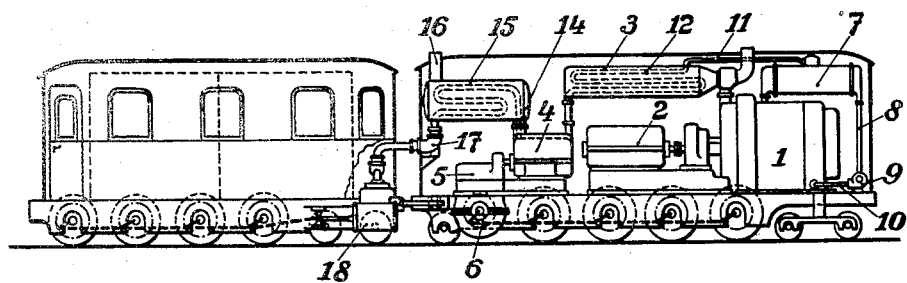
Figure 2:
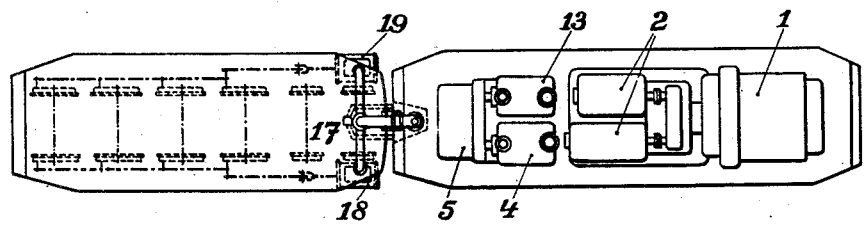
Fig. 2 is plan view illustrating the arrangement of the several engines on the locomotive and tender.
Figure 3:
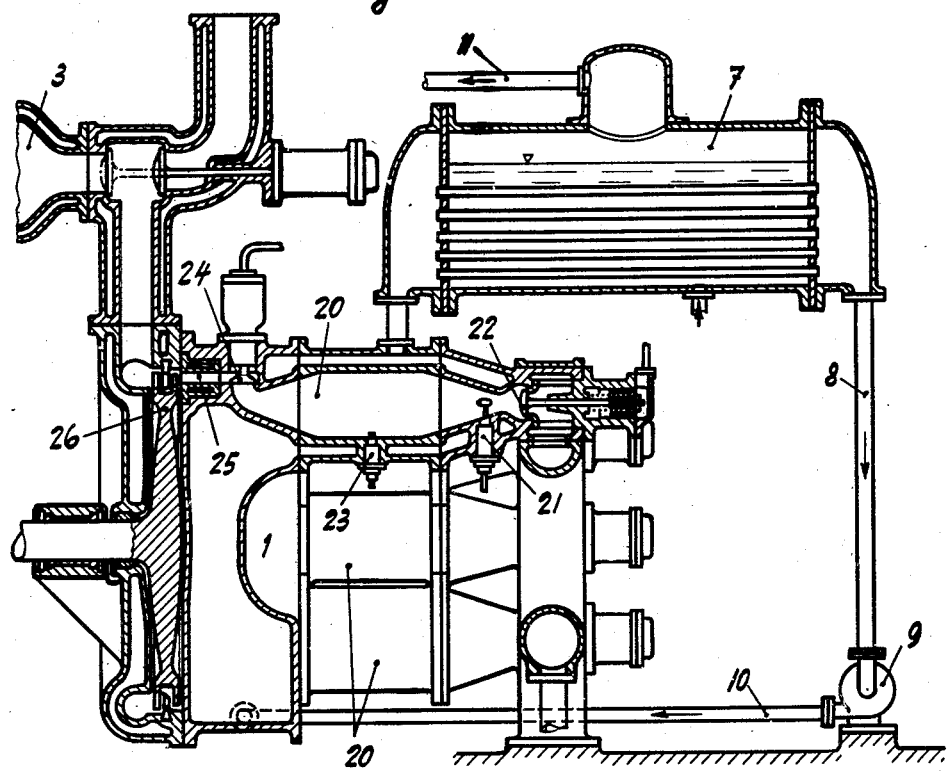
Fig. 3 shows a section through the explosion turbine and cooling oil circuit on an enlarged scale.
Figure 4:
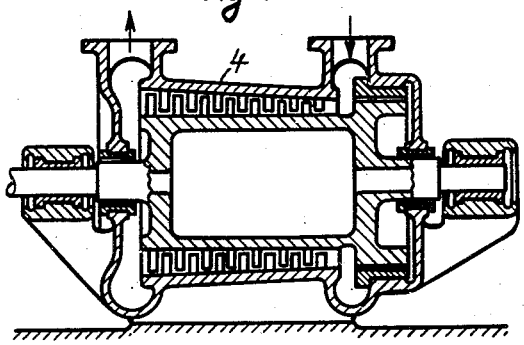
Fig. 4 is a section through one of the subsequent turbines which operate under continuous current.

The numeral 1 designates the explosion turbine which, with the compressor 2 driven thereby, forms the primary machine section of the plant. The explosion turbine 1 includes a plurality of explosion chambers 20 which are periodically fed with fuel by the injection apparatus 21 and with compressed air by the valves 22, the air being delivered by the compressor 2, the successive explosive charges being periodically ignited by the spark plugs 23 and then discharged by a nozzle valve 24 into an expansion nozzle 25 wherein the gases are expanded to a pressure above atmospheric. The gases are then directed by the nozzles in successive puffs against the rotor 26 of the explosion turbine 1. The hot exhaust gases, which are still under high pressure, are then conveyed by conduit 3 to the combustion gas section 4 of the expansion machine. This combustion gas section consists of a continuous current turbine, such as a Parsons wheel which has a plurality of expansion stages, as shown in Fig. 4; such turbine delivering its power output to the dummy shaft 6 through the bevel gear transmission 5. The driving axles of the locomotive are coupled with the shaft 6.

The oil employed to cool the explosion turbine 1 gives up its absorbed heat in a heat exchanger 7 to water which has preferably been preheated, such water being thereby evaporated. The recooled oil is returned to the turbine 1 by pipe 8, pump 9 and conduit 10. The steam withdrawn from the exchanger or boiler 7 is conducted by conduit 11 to a superheating coil 12 arranged in the gas conduit 3. The superheated steam is conveyed to a steam turbine 13 arranged parallel to the continuous current turbine 4, which may be constructed similarly to that shown in Fig. 4. The turbine 13 also delivers its output to the bevel gear transmission 5 and thus to the dummy shaft 6 common to the two turbines 4 and 13. The continuous current turbines 4 and 13 form the driving engines of the locomotive.

The turbine 13 is a counter pressure turbine. The steam withdrawn from the last pressure stage is conducted by pipe 14 to a superheating coil arranged in the heat exchanger 15 which is traversed by the gases exhausting from the continuous current gas turbine 4. The completely exhausted gases escape through pipe 16 into the atmosphere. The intermediately superheated steam is conducted by a steam conduit 17 of the type employed in Fairlie locomotives and provided with stuffing boxes and ball bearings, to the piston engines 18 and 19 arranged to drive the tender. The other axles of the tender are connected as coupling axles with the driving axle in known manner.

It will be evident that the above arrangement wherein the tender is independently driven, may also be employed for those types of locomotives which contain independently driven sections. The invention thus relates also to the drive of double locomotives as locomotives of the Mallet, Fairlie and similar types.

Various modifications may be resorted within the scope of the appended claims without departing from the spirit of the invention.

I claim:

1. A portable power plant for a locomotive provided with a tender, said power plant comprising an explosion turbine, a compressor driven by said turbine, means for generating steam with the aid of the waste heat of the turbine, and expansion engines mounted independently of said turbine and driven by the exhaust gases of said turbine and by said steam, said expansion engines delivering the total available output of the plant, certain of said engines being geared to an axle of said tender to drive the latter positively.

2. A power plant as set forth in claim 1, wherein the part of the expansion engines driving the tender is operated by steam, while the part operated by combustion gases drives the locomotive exclusively and is mounted upon the latter.

3. A power plant as set forth in claim 1, wherein the part of the expansion engines driving the tender is of the piston type, while the engines driving the locomotive are in the form of turbines.

4. A power plant as set forth in claim 1, wherein the engines driving the locomotive include a steam turbine and a continuous current gas turbine, the engine section driving the tender being operated by the exhaust steam of said steam turbine, said plant including an interstage superheater for said exhaust steam heated by the completely exhausted gases.

Signed at Cologne, Germany, this 20th day of January A. D. 1931.

HANS HOLZWARTH.